(12) United States Patent
Lu

(10) Patent No.: US 7,800,257 B2
(45) Date of Patent: Sep. 21, 2010

(54) HEAT DISSIPATER

(76) Inventor: Sean Lu, 14 Primrose La., Westborough, MA (US) 01581

( * ) Notice: Subject to any disclaimer, the term of this patent is extended or adjusted under 35 U.S.C. 154(b) by 342 days.

(21) Appl. No.: 11/923,433

(22) Filed: Oct. 24, 2007

(65) Prior Publication Data

US 2008/0100150 A1   May 1, 2008

Related U.S. Application Data

(60) Provisional application No. 60/862,905, filed on Oct. 25, 2006.

(51) Int. Cl.
*H02K 41/00* (2006.01)

(52) U.S. Cl. .................. 310/12.29; 336/61; 336/65; 310/64

(58) Field of Classification Search ............ 310/12, 310/12.01, 12.21, 12.23, 12.29, 64; 336/61, 336/65

See application file for complete search history.

(56) References Cited

U.S. PATENT DOCUMENTS

| 5,469,124 | A * | 11/1995 | O'Donnell et al. | 336/61 |
| 6,002,318 | A * | 12/1999 | Werner et al. | 336/61 |
| 2006/0076843 | A1 * | 4/2006 | Chang | 310/87 |
| 2007/0257563 | A1 * | 11/2007 | Huang et al. | 310/12 |

* cited by examiner

*Primary Examiner*—Quyen Leung
*Assistant Examiner*—Leda Pham
(74) *Attorney, Agent, or Firm*—Bose Corporation

(57) ABSTRACT

A heat dissipater within a linear motor system comprising a core, the core having a base and a projecting portion projecting from the base; the heat dissipater in thermal contact with the core; and a coil wrapped around both the core and the heat dissipater.

5 Claims, 3 Drawing Sheets

HEAT DISSIPATER

Pursuant to 35 USC 119(e), this application claims the benefit of prior U.S. Provisional Application No. 60/862,905, filed Oct. 25, 2006, and is incorporated by reference in its entirety.

BACKGROUND OF THE INVENTION

The present invention relates to a heat dissipating device for use in a linear motor. An example of a linear motor is described in U.S. Pat. No. 6,405,599, which is hereby incorporated by reference.

SUMMARY OF THE INVENTION

A heat dissipating plate for a linear motor comprises a high thermal conductivity, low electrical conductivity material in thermal contact with the motor's core. The heat dissipater is capable of transferring heat away from the core and surrounding coils in order to keep the coils from exceeding their maximum operating temperature.

One embodiment of the present invention is directed to a heat dissipater for use in a linear motor. In one aspect, the heat dissipater comprises two portions. In one aspect, one of the portions comprises a high thermal conductivity material. In one aspect, one of the portions comprises a low electrical conductivity material. In one aspect, both of the portions comprise a high thermal conductivity material. In one aspect, both of the portions comprise a low electrical conductivity material. In one aspect, the first portion comprises a material selected from the group consisting of: graphite and aluminum silicon carbide. In one aspect, the second portion is comprised of a material selected from the group of: copper, silver, and an aluminum alloy.

Another embodiment of the present invention is directed to a method of conducting heat generated by the coil of a linear motor via a heat dissipater. In one aspect, the heat dissipater comprises two portions. In one aspect, one of the portions comprises a high thermal conductivity material. In one aspect, one of the portions comprises a low electrical conductivity material. In one aspect, both of the portions comprise a high thermal conductivity material. In one aspect, the first portion comprises a material selected from the group of: graphite and aluminum silicon carbide. In one aspect, the second portion is comprised of a material selected from the group of: copper, silver, and an aluminum alloy.

Another embodiment of the present invention is directed to an apparatus comprising: an upper coil assembly, wherein the upper coil assembly includes a coil surrounding a core, at least a portion of the core comprising a material characterized by a high thermal conductivity and a low electrical conductivity; a lower coil assembly, wherein the lower coil assembly includes a coil surrounding a core, at least a portion of the core comprising a material characterized by a high thermal conductivity and a low electrical conductivity; a magnet flexure assembly located between the upper coil assembly and the lower coil assembly; and at least one heat dissipater, wherein the at least one heat dissipater is in thermal contact with at least one of the upper coil assembly and lower coil assembly. In one aspect, the heat dissipater comprises two portions. In one aspect, the first portion comprises a material selected from the group consisting of: graphite and aluminum silicon carbide. In one aspect, the second portion is comprised of a material selected from the group of: copper, silver, and an aluminum alloy.

Another embodiment of the present invention is directed to a method comprising: conducting heat generated by a coil within a linear motor, the linear motor having at least one coil assembly, the at least one coil assembly including a coil surrounding a core, wherein heat is conducted via a heat dissipater. In one aspect, the core is configured to limit the coil temperature to no greater than 200 degrees Celsius. In one aspect, the heat dissipater comprises two portions. In one aspect, the first portion comprises a material selected from the group consisting of: graphite and aluminum silicon carbide. In one aspect, the second portion is comprised of a material selected from the group of: copper, silver, and an aluminum alloy.

BRIEF DESCRIPTION OF THE DRAWINGS

The invention will be described by reference to the preferred and alternative embodiments thereof in conjunction with the drawings in which like structures are referenced with like numbers.

DETAILED DESCRIPTION

Figure 1:
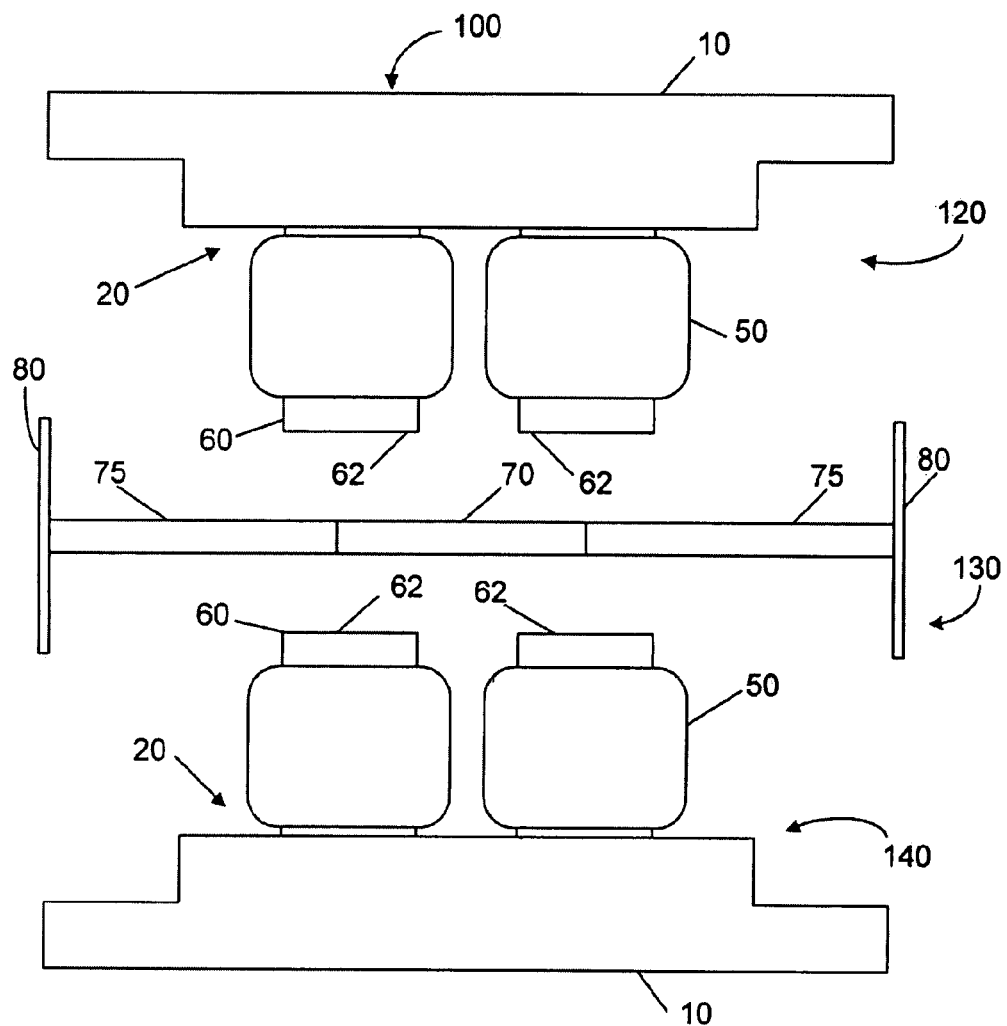
FIG. 1 is a cross-sectional view of an embodiment of the present invention.

In FIG. 1, linear motor system 100 comprises an upper coil assembly 120, lower coil assembly 140, and magnet flexure assembly 130. Each coil assembly has a core base portion 10, which mechanically supports the coils 50, which are wrapped around the core 60. The core 60 is attached to the base portion 10. During operation, electrical current through coils 50, creates a magnetic field that interacts with a magnet 70 in the magnet flexure assembly 130. By controlling the direction and level of the current applied to the coils 50, the polarity and strength of the magnetic field generated at the end 62 of the core 60 can be controlled.

Each pole of the magnet 70 is attached to a flexure 80 via a support 75. These flexures 80 allow the magnet 70 to move in the horizontal (left to right) dimension, thus driving the linear motor system 100.

Figure 2:
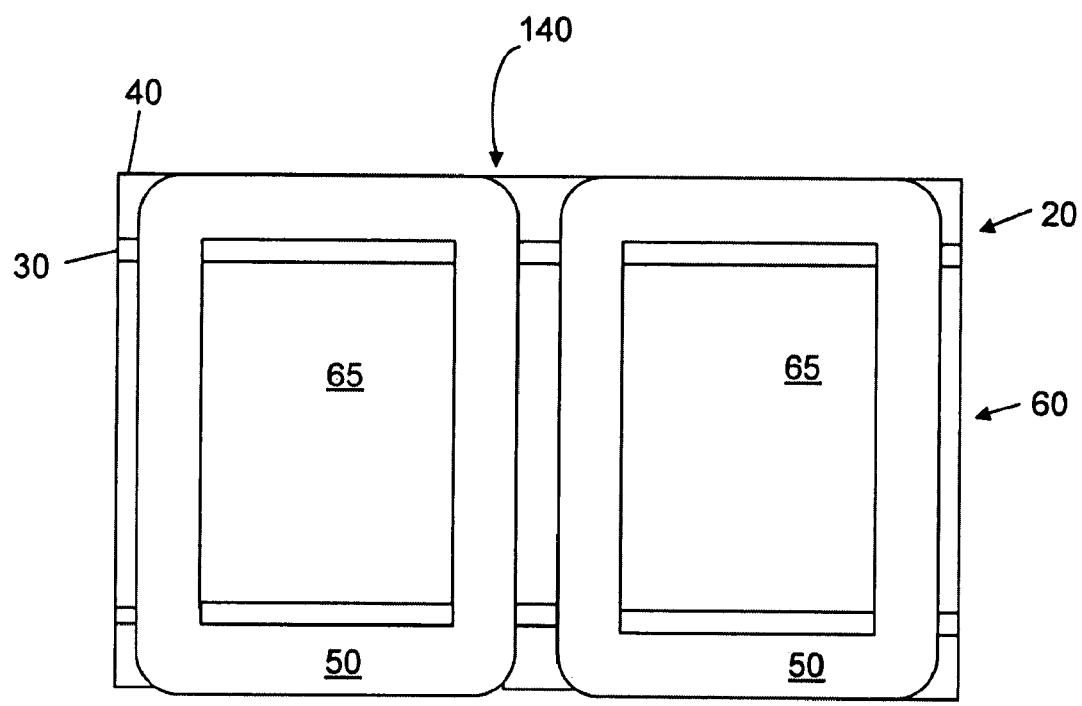
FIG. 2 is a cross-sectional top view of an embodiment of the present invention.

FIG. 2 is a cross-sectional top view of the lower coil assembly 140. This is also an identical view of an inverted cross-section of upper coil assembly 120. In FIG. 2, coils 50 are shown wrapped around a core 60. The core 60 includes a center portion 65 and a heat dissipater 20. The first portion 30 of heat dissipater 20 is in thermal contact with the core 60, and may be affixed to the core 60 in any manner now known or later developed. The second portion 40 is in thermal contact with the first portion 30, and may be affixed to the first portion 30 in any manner now known or later developed. During operation of the linear motor system 100, heat generated in the coil 50 is conducted away from the cores 60 via the first portion 30 and second portion 40 of the heat dissipater 20.

Figure 3:
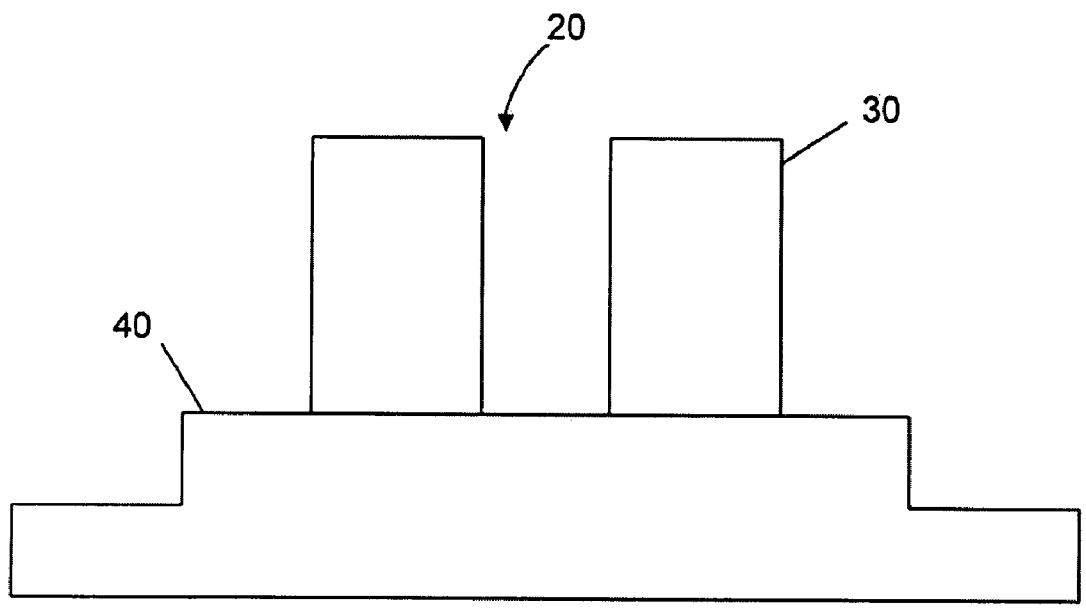
FIG. 3 is a plan view of the heat dissipater.

FIG. 3 is a plan view of the heat dissipater 20. The shape of heat dissipater 20 is merely illustrative, in that the heat dissipater 20 can take any form that allows for the transfer of heat away from the surrounding coils 50 (not shown). The heat dissipater 20 may be comprised of two portions, a first portion 30 and a second portion 40. Either or both portions 30 and 40 may be connected to the core 60 (not shown) by any means now known or later discovered. The first portion 30 is in thermal contact with second portion 40.

During operation of the linear motor system 100, large amounts of heat can be generated. In one configuration, electric coils 50 are wrapped around a center portion 65 of a metal core 60. During operation, those coils 50 generate a large amounts of heat. In order to satisfy safety requirements of the coils 50, this heat must be dissipated away from the core 60 and coils 50. This can be accomplished using a heat dissipater 20, placed between the core 60 and coils 50. The heat dissipater 20 can be affixed to the core 60 such that it remains in place during operation of the linear motor system 100.

The core used in one configuration is formed of a metal. A metal core allows the linear motor system to produce a higher force on the magnet through a higher magnetic flux, without reaching the magnetic saturation state of the core. Magnetic saturation is a condition in which increasing current through an inductor (core) produces little or no effect on the magnetic force of the field. Magnetic saturation is especially a concern in ferrite materials, where such materials saturate at lower magnetic flux levels. For example, iron inductors can saturate at magnetic flux levels three to eight times that of inductors utilizing ferrite materials.

However, a system maintaining the large electrical currents necessary to produce a high magnetic flux will produce more heat. A heat dissipater transfers this heat away from the coils and core. In some configurations, the heat dissipater is located adjacent to the interior surface of the coil. Both the heat dissipater and the metal core are within the alternating magnetic field generated by the coil. The alternating magnetic field generates currents within the core and the heat dissipater. The amount of Eddy current produced within a material depends upon the electrical conductivity of that material. The greater the Eddy currents within a material, the more heat that material will generate.

Therefore, in the case of a heat dissipater, it is advantageous to use a material that will transfer heat away from the coils while generating less Eddy current heat than is generated in the core. Heat generation in the heat dissipater may be reduced by selecting a material characterized by a low electrical conductivity. As used herein, material characterized by a low electrical conductivity is one that has an electrical conductivity below that of the core material.

An example of a metal core material that may be used is low-carbon iron, characterized by an electrical conductivity of $9.36 \times 10^6$ siemens/meter. A heat dissipater characterized by an electrical conductivity lower than that of the core material will reduce the generation of Eddy currents within the heat dissipater. Examples of materials suitable for a portion of the heat dissipater in this configuration are graphite, characterized by an electrical conductivity of $1.67 \times 10^5$ siemens/meter, and aluminum silicon carbide, characterized by an electrical conductivity of $4.83 \times 10^6$ siemens/meter.

As stated above, operation of a linear motor generates large amounts of heat. In the example of a linear motor in an active suspension actuator, the heat dissipation may reach 1500 Watts in each coil assembly. In this example, safety considerations may limit the coil operating temperature to 200 degrees Celsius, and preferably to 170 degrees Celsius. In such an example, typical thermal design targets call for a maximum thermal resistance of 0.10 degrees Celsius per Watt (from coil to ambient air). As used herein, a material characterized by high thermal conductivity is one that has a thermal conductivity greater than 100 W/m–k. Examples of such materials are aluminum silicon carbide, characterized by a thermal conductivity of approximately 200 W/m–k and graphite, characterized by a thermal conductivity of approximately 380 W/m–k.

Coils in a linear motor can be bobbin-wound, potted, or placed over the core in any other fashion now known or later developed. In a conventional configuration, both bobbin-wound and potted coils will result in a coil temperature of over 170 degrees Celsius. In particular, the bobbin-wound coil configuration results in an extremely high thermal resistance due to the air gaps between the coils. In this configuration, coil temperatures can reach 450 degrees Celsius. In a conventional potted-coil configuration (1.5 mm, potting thickness and 0.2 mm powder coating), coil temperatures can reach 205 degrees Celsius. Powder coating is a process that insulates the core, whereby insulation powder is electrostatically applied to the core, and then cured to hold in place. After powder coating occurs, the coils can be potted. Potting is the process of bonding the coils to the powder coated core. Both powder coating and potting create a barrier between the coils and the core, creating an area of thermal resistance. As powder coating and potting thicknesses: increase, so does the thermal resistance of the area between the coils and the core.

A conventional method for reducing coil temperatures in bobbin-wound configurations has been to reduce air gaps between coils. In the potted-coil configuration, coil temperatures have been reduced by minimizing the potting thickness. However, neither of these methods can achieve a maximum coil temperature below 170 degrees Celsius.

In one example, the heat dissipater is placed between the coils and the core. This allows for direct cooling of the coils through use of an increased cooling area. As discussed above, the heat dissipater is constructed of a low electrical conductivity material so as to prevent the introduction of Eddy heat into the system. In this embodiment, the heat dissipater is comprised of two portions, one of which is not positioned between the coils and the core. That second portion is placed outside of the coils, and is in contact with a heat sink.

In one example, both the first and second portion of the heat dissipater are formed of graphite. This allows for the transfer of heat away from the coils. In the interest of reducing costs, the second portion of the heat dissipater can be formed of aluminum or another material of high thermal conductivity.

In one example, the powder coating thickness may be approximately 0.2 mm and the potting thickness may be approximately 1.0 mm. This ensures that the thermal resistance from the coil to the core is approximately 0.063 degrees Celsius per Watt and that the maximum coil temperature will remain below 170 degrees Celsius.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. An apparatus comprising:
  a core for use in a linear motor, the core having a base and a projecting portion projecting from the base;
  a heat dissipater in thermal contact with the core; and
  a coil wrapped around both the core and the heat dissipater;
  wherein the heat dissipater comprises a first portion and a second portion, the first portion in thermal contact with the coil,
  the first portion comprises a material characterized by a thermal conductivity greater than 100 W/m-k, and the first portion comprises a material characterized by a lower electrical conductivity than the core.

2. The apparatus of claim 1, wherein the second portion comprises a material characterized by a thermal conductivity greater than 100 W/m-k.

3. The apparatus of claim 1, wherein the second portion comprises a material characterized by a lower electrical conductivity than the core.

4. The apparatus of claim 1, wherein the first portion comprises a material selected from the group consisting of: graphite and aluminum silicon carbide.

5. The apparatus of claim 1, wherein the second portion comprises a material selected from the group consisting of: copper, silver, and an aluminum alloy.

* * * * *